United States Patent [19]

Hsu

[11] Patent Number: 5,598,688
[45] Date of Patent: Feb. 4, 1997

[54] APPARATUS FOR CLEARING WATER CREEPERS

[75] Inventor: Chih-Hsiung Hsu, Changhua Hsien, Taiwan

[73] Assignee: San Hsiung Equipment Co., Ltd., Changhua Hsien, Taiwan

[21] Appl. No.: 433,919

[22] Filed: May 2, 1995

[51] Int. Cl.$^6$ ...................................................... A01D 44/00
[52] U.S. Cl. ............................ 56/9; 56/8; 56/16.6; 37/338
[58] Field of Search .................... 56/8, 9, 16.6; 460/114; 37/317, 319, 338, 339

[56] References Cited

U.S. PATENT DOCUMENTS

| | | | |
|---|---|---|---|
| 1,222,324 | 4/1917 | Richardson | 56/9 |
| 2,978,819 | 4/1961 | Paulson | 37/315 X |
| 3,347,029 | 10/1967 | Grinwald | 56/9 |
| 3,468,106 | 9/1969 | Myers et al. | 56/9 |
| 3,540,194 | 11/1970 | Chaplin | 56/9 X |
| 3,698,163 | 10/1972 | Keplin | 56/9 |
| 3,802,022 | 4/1974 | Fleming | 56/9 X |
| 3,955,294 | 5/1976 | Morgenstein | 37/338 X |
| 4,638,621 | 1/1987 | Stewart, III et al. | 56/9 |
| 5,083,417 | 1/1992 | Jeronimidis et al. | 56/9 |

*Primary Examiner*—Terry Lee Melius
*Assistant Examiner*—Thomas A. Beach
*Attorney, Agent, or Firm*—Browdy and Neimark

[57] ABSTRACT

An apparatus for clearing water creepers, including a base, a crashing machine fixed on the base and a conveyor having a conveying belt surrounding a head shaft, a tail shaft and multiple intermediate shafts. The base is adapted to be located on a boat or a truck and the crashing machine includes a housing, a head portion formed with an entrance and a neck portion 180 degrees rotatably supporting the head portion. A set of twisting rollers and a set of mashing rollers are disposed in the housing for mashing the creepers. An exhausting funnel is disposed under the housing for discharging mashed creepers. A pair of fixing seats are disposed in front of the entrance for rotatably supporting the head shaft of the conveying belt. The conveying belt is disposed with multiple mesh-like taking spoons on a surface thereof and two propeller-like knife means are respectively disposed on two sides of the tail shaft of the conveying belt for previously cutting tangling creepers into small pieces.

1 Claim, 4 Drawing Sheets

APPARATUS FOR CLEARING WATER CREEPERS

BACKGROUND OF THE INVENTION

The present invention relates to an apparatus for clearing water creepers, also known as water hyacinths, and more particularly to an apparatus which is able to easily and quickly clear up creepers living a pond or a river without costing much labor and using any chemical agent.

It is known that the creepers living a pond or a river always form an obstacle to the living of other kinds of useful plants. Therefore, it is necessary to clear the creepers from time to time. Industrially, the creepers are generally cleared in such a manner that a chemical agent is first sprayed over the pond or river to kill the creepers and then a dredger is used to dredge up the dead creepers from the pond or river. Such procedure is very laborious and expensive as well as troublesome. Moreover, the sprayed chemical agent will contaminate the pond or river or other water sources.

Therefore, it is necessary to provide an apparatus which is able to effectively and quickly clear up the creepers living on a pond, or a river without using any chemical agent.

SUMMARY OF THE INVENTION

It is therefore a primary object of the present invention to provide an apparatus which is able to easily and quickly clear up creepers living a pond or a river so as to save the labor and cost needed in the conventional measures.

It is a further object of the present invention to provide the above apparatus which can clear up the creepers without using any chemical agent so that the contamination of the water source is eliminated.

It is still a further object of the present invention to provide the above apparatus which is able to mash the creepers into fine particles to serve as fowl or fish feed or a manure.

According to the above objects, the present invention includes a base, a crashing machine (or, mashing machine) fixed on the base and a conveyor having a conveying belt surrounding a head shaft, a tail shaft and multiple intermediate shafts. The base is adapted to be located on a boat or a truck and the crashing machine includes a housing, a head portion formed with an entrance and a neck portion 180 degrees rotatably supporting the head portion. A set of twisting or pulling rollers and a set of mashing rollers are disposed in the housing. An exhausting funnel is disposed under the housing. A pair of fixing seats are disposed in front of the entrance for rotatably supporting the head shaft of the conveying belt. A motor is disposed behind the fixing seats for driving the conveying belt. The conveying belt is disposed with multiple mesh-like taking spoons on a Surface thereof and two propeller-like knife means are respectively disposed on two sides of the tail shaft of the Conveying belt for initial cutting of the tangling creepers into small pieces, whereby the conveying belt is rotated counterclockwise with the openings of the taking spoons faced upward and the taking spoons can take up the creepers in the water with the water drained out through the meshes of the taking spoons. The taken up creepers are conveyed and fed into the entrance of the crashing machine. The pulling rollers and mashing rollers are rotated inward toward each other so that after fed through the entrance into the crashing machine, the creepers are first twisted into coarse particles by the twisting rollers and then mashed into fine particles by the mashing rollers to be exhausted from the exhausting funnel.

The present invention can be best understood through the following description and accompanying drawings, wherein:

DETAILED DESCRIPTION OF THE PREFERRED EMBODIMENT

Figure 1:
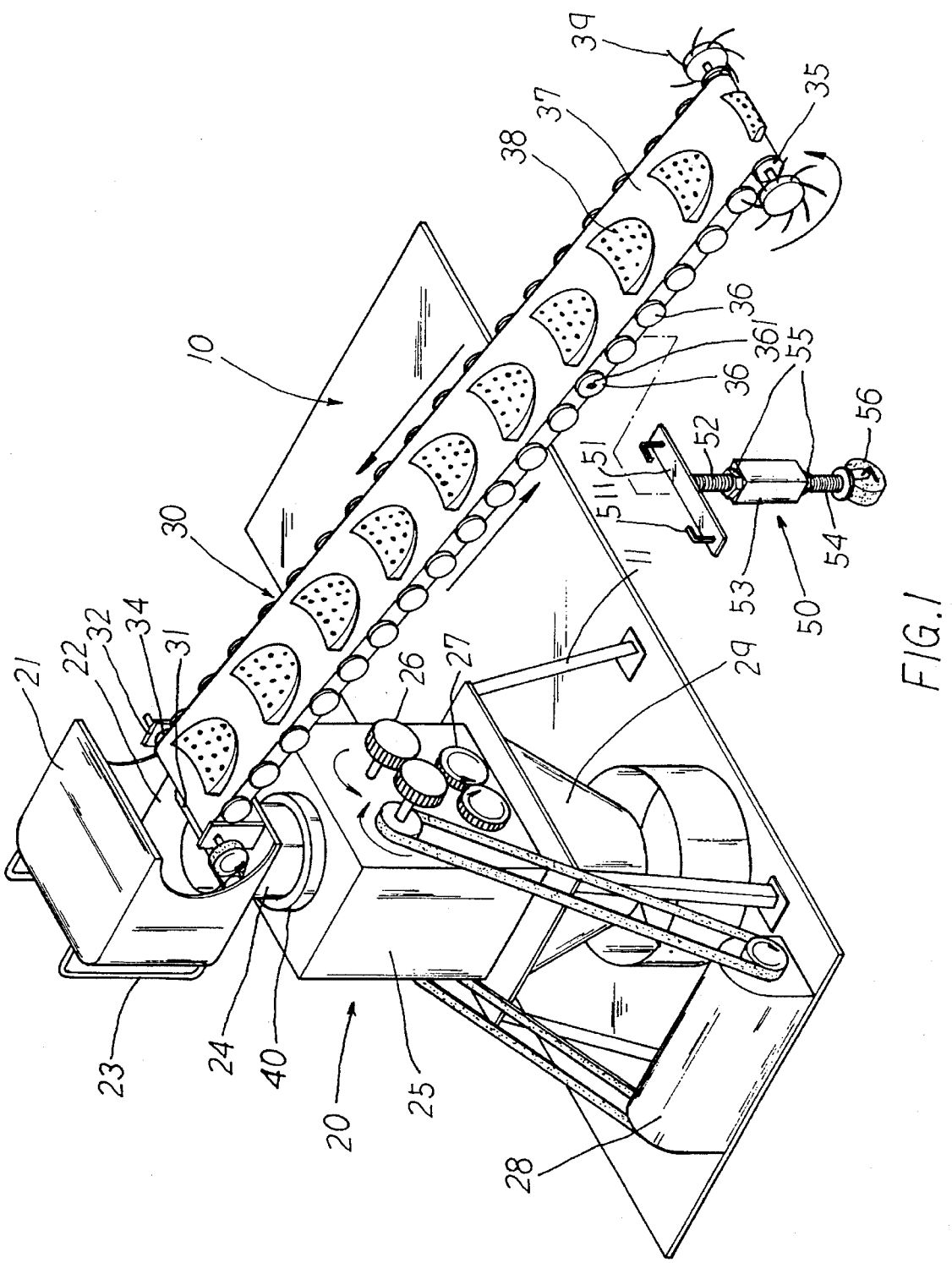
FIG. 1 is a perspective exploded view of the present invention.
Figure 2:
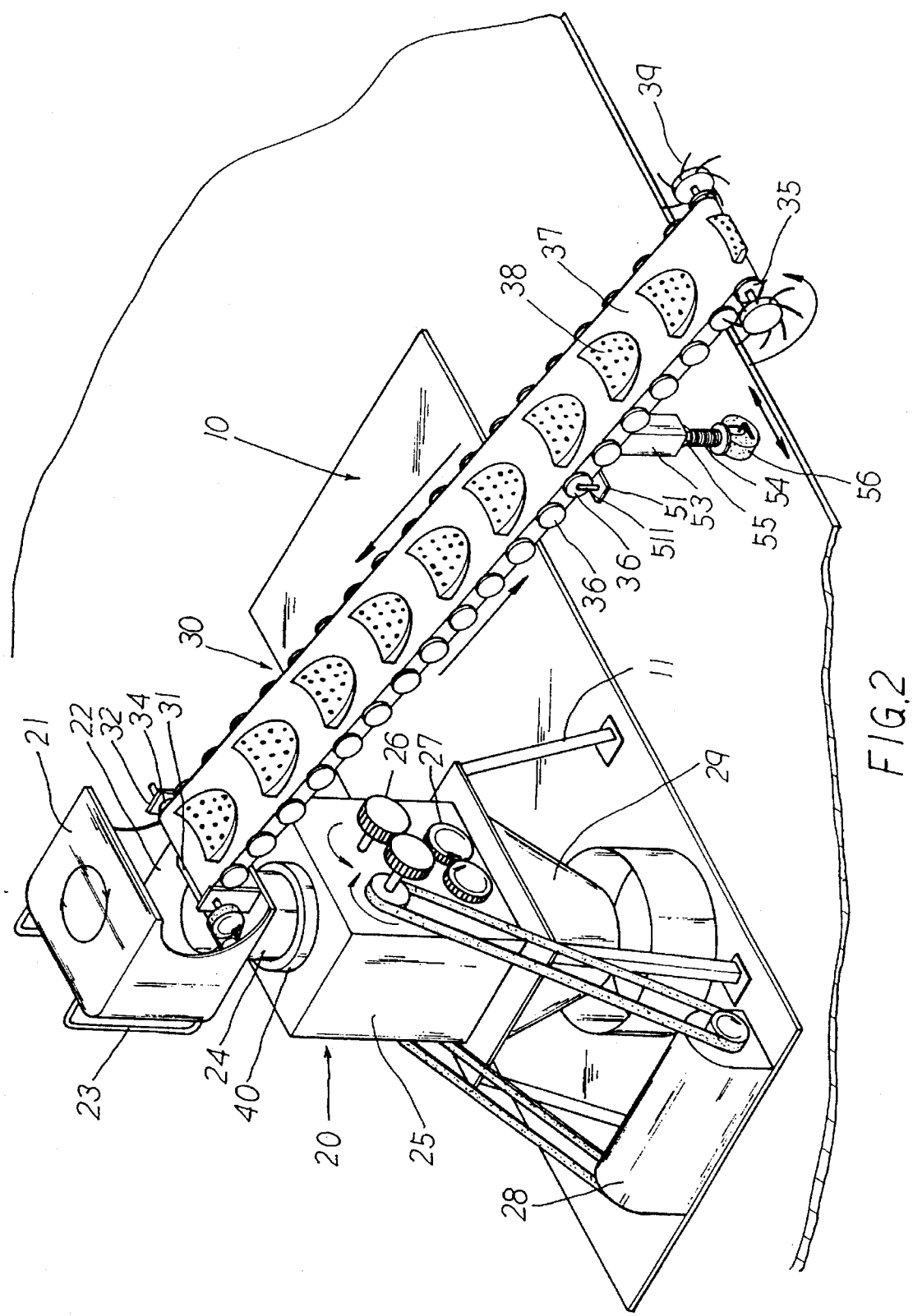
FIG. 2 is a perspective assembled view of the present invention.

Please refer to FIGS. 1 to 5. The present invention mainly includes a base 10, a crashing machine 20 and a conveyor 30 having a conveying belt 37. The conveying belt 37 surrounds a head, upper, or out put end shaft 32, a tail, lower, or input end shaft, 35 and multiple intermediate shafts 36. The base 10 is adapted to be located on a boat or a truck and the crashing machine 20 is fixedly supported on the base 10 by four Supports 11. The crashing machine 20 includes a housing 25, a head portion 21 formed with an entrance 22 for Conveying the creepers into the crashing machine 20, and a neck portion 24 rotatably disposed in a bearing 40 for the head portion 21 to rotate through 180 degrees. A set of twisting or pulling rollers 26 are disposed in an upper section of the housing 25 and a set of mashing rollers 27 are disposed in a lower section thereof. An exhausting funnel 29 is disposed under the housing 25 for discharging the mashed creepers.

A first driving motor 28 is disposed On a lateral side of the base 10, which through belts drives the pulling rollers 26 and mashing rollers 27. A pair of fixing seats 32 are disposed in front of the entrance 22, each of which is formed with a pivot hole 33 for the head shaft 34 of the conveying belt 37 to rotatably fit therein.

The conveying belt 37 is formed with multiple mesh-like taking spoons 38 on the surface. Two propeller-like knife means 39 are respectively disposed on two sides of the tail shaft 35 of the conveying belt 37 for previously cutting the tangling creepers into small pieces.

Figure 5:
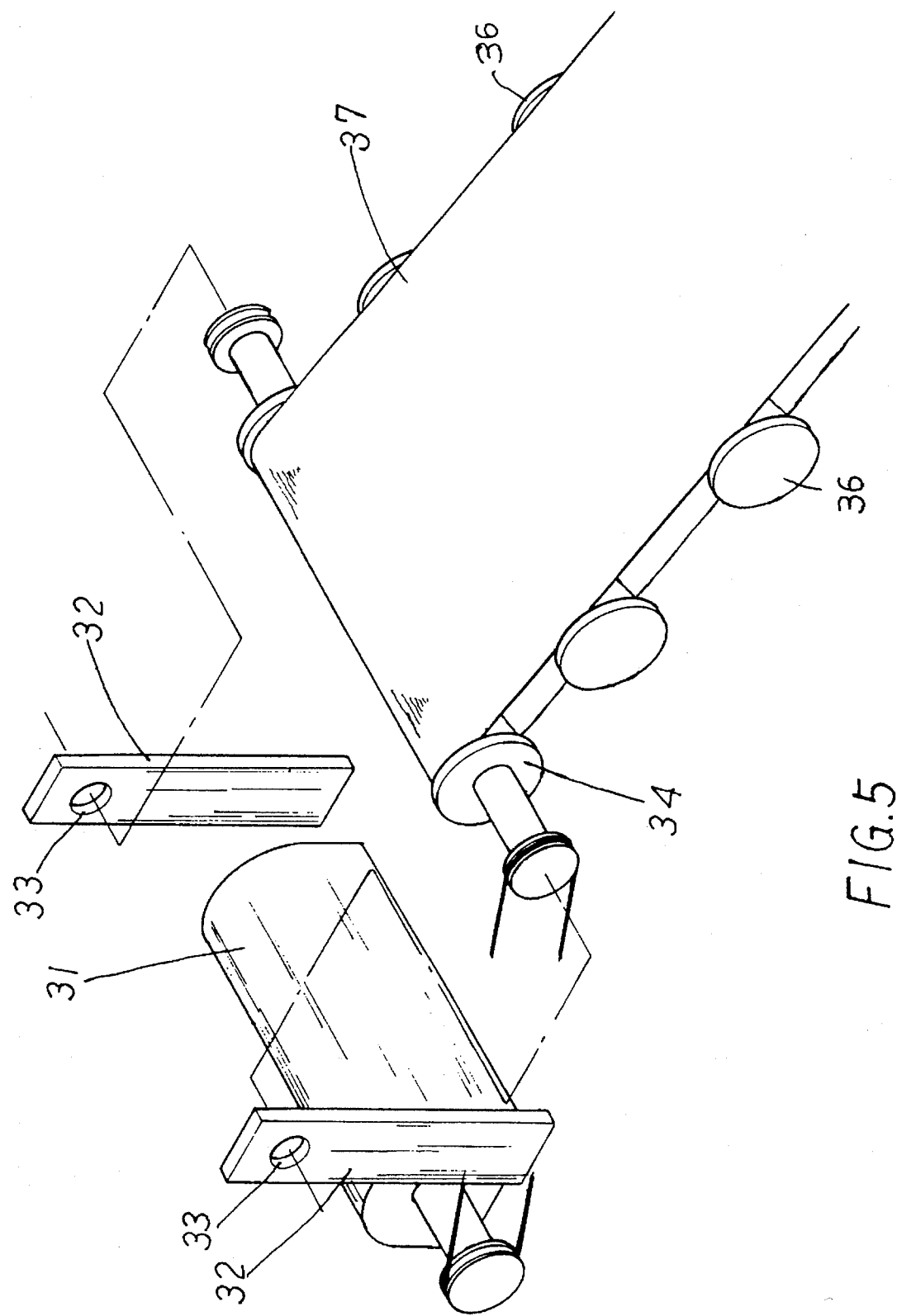
FIG. 5 is a perspective view showing the relationship between the conveying belt, fixing seats and driving motor for the conveying belt.

A second motor 31 is disposed behind the fixing seats 32 for driving the head shaft 34 of the conveying belt 37 so as to drive the same as shown in FIG. 5. One of the intermediate shafts 36, which is located On a lower portion of the conveying belt 37, is formed with rectangular holes 361. A supporting leg 50 is disposed under the conveying belt 37, having-an upper supporting board 51.with a width larger than that of the conveying belt 37. Two rectangular L-shaped projections 511 are disposed on two ends of the supporting board 51 for fitting into the rectangular holes 361 of the shaft 36. Under the supporting board 51 are disposed a first thread rod 52, a thread sleeve 53, a second thread rod 54 and a brake caster 56. Two nuts 55 are loosenably disposed at two ends of the thread sleeve 53 and screwed respectively on the first and second thread rods 52, 54, whereby the thread rods 52, 54 are adjustably screwed in the thread sleeve 53 for adjustment of the height of the supporting leg 50 and the angle of the conveyor 30. The brake caster 56 permits the conveyor 30 to be freely revolved about the crashing machine 20.

Figure 3:
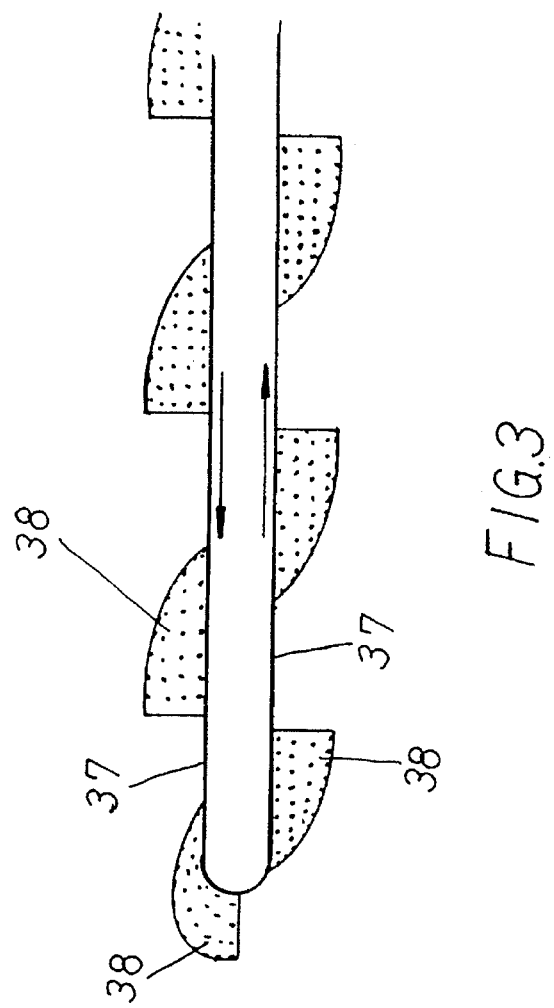
FIG. 3 is a sectional view showing that the conveying belt with the mesh-like taking spoons is rotated counterclockwise to take up the creepers.
Figure 4:
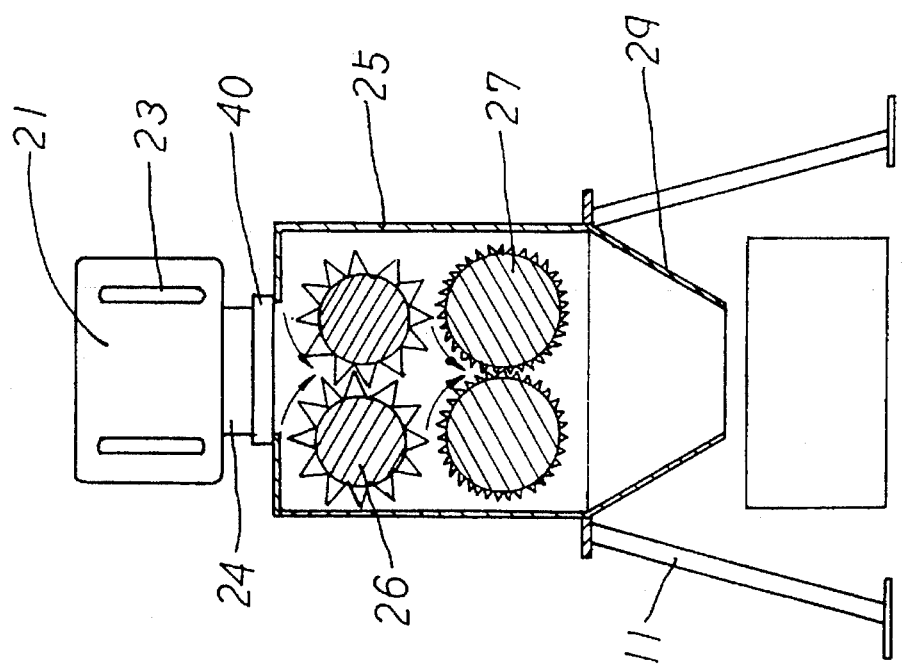
FIG. 4 is a sectional view showing the operation of the twisting rollers and mashing rollers of the present invention.

Referring to FIG. 3, the conveying belt 37 is rotated counterclockwise with the openings of the taking spoons 38 faced upward, whereby the taking spoons 38 can take up the creepers in the water with the water drained out through the meshes of the taking spoons 38. The taken-up creepers are conveyed and fed into the entrance 22 of the crashing machine 20. As shown in FIG. 4, the twisting (pulling) rollers 26 and mashing rollers 27 are rotated inward toward each other so that after fed through the entrance 22 into the crashing machine 20, the creepers are first broken into coarse particles by the pulling rollers 26 and then mashed into fine particles by the mashing rollers 27 to be exhausted from the exhausting funnel 29.

The above apparatus not only can be mounted on a boat for clearing the creepers living in a pond or a river, but also can be mounted on a vehicle with the conveying belt placed in the water, whereby the vehicle can run along the river side to clear the creepers.

The above embodiment is only an example of the present invention and the scope of the present invention should not be limited to the example. Any modification or variation derived from the example should fall within the scope of the present invention.

What is claimed is:

1. An apparatus for clearing water creepers, comprising a base, a mashing machine and a conveyor having a conveying belt surrounding an output-end shaft, an input-end shaft and multiple intermediate shafts, wherein:

the base is adapted to be located on a boat or a truck and the mashing machine is fixedly supported on the base by supports;

the mashing machine includes a housing, a head portion formed with an entrance for feeding the creepers into the mashing machine, and a neck portion rotatably disposed in a bearing for the head portion to rotate through 180 degrees, a set of pulling rollers being disposed in an upper section of the housing for breaking the creepers into coarse particles and a set of mashing rollers being disposed in a lower section thereof for mashing the creepers into fine particles, an exhaust funnel being disposed under the housing for discharging mashed creepers;

a first driving motor is disposed on a lateral side of the base, which through belts drives the pulling rollers and mashing rollers;

a pair of fixing seats are disposed in front of the entrance, each of which is formed with a pivot hole for the head shaft of the conveying belt to rotatably fit therein;

the conveying belt is disposed with multiple mesh-like taking spoons on a surface thereof and two rotating propellar-like knife means are respectively disposed on two sides of the input-end shaft of the conveying belt for cutting tangling ones of the creepers into small pieces;

a second motor is disposed behind the fixing seats for driving the conveying belt; and one of the intermediate shafts, which is located on a lower portion of the conveying belt is formed with rectangular holes, a supporting leg being disposed under the conveying belt, having an upper supporting board with a width larger than that of the conveying belt, two rectangular L-shaped projections being disposed on two ends of the supporting board for fitting into the rectangular holes of the intermediate shaft, under the supporting board being disposed a first thread rod, a thread sleeve, a second thread rod and a brake caster, two nuts being loosenably disposed at two ends of the thread sleeve and screwed respectively on the first and second thread rods, whereby the thread rods are adjustably screwed in the thread sleeve for height-adjustment of the supporting leg and angle-adjustment of the conveyor.

* * * * *